US005747093A

United States Patent [19]

Kaczmarczyk

[11] Patent Number: 5,747,093
[45] Date of Patent: May 5, 1998

[54] SUCROSE-FREE DIETARY FIBER COMPOSITION

[76] Inventor: Sabina W. Kaczmarczyk, 119 E. Main St., Somerville, N.J. 08876

[21] Appl. No.: 829,083

[22] Filed: Mar. 31, 1997

[51] Int. Cl.$^6$ .................... A23L 1/212; A23L 1/0534
[52] U.S. Cl. .................... 426/617; 426/93; 426/548; 426/573
[58] Field of Search .................... 426/573, 617, 426/93, 548

[56] References Cited

U.S. PATENT DOCUMENTS

| 512,050 | 4/1894 | Walker et al. ............... 426/617 |
| 1,060,912 | 5/1913 | Lasby ............... 426/617 |
| 4,098,912 | 7/1978 | Mercado-Flores et al. ............... 426/617 |
| 4,619,831 | 10/1986 | Sharma . | |
| 5,073,370 | 12/1991 | Meer et al. . | |
| 5,516,524 | 5/1996 | Kais et al. . | |

OTHER PUBLICATIONS

A product kown as Citrucel® manufactured by SmithKline Beacham Consumer Healthcare, L.P., Pittsburgh, Pennsylvania.

*Primary Examiner*—Helen Pratt
*Attorney, Agent, or Firm*—Kenneth P. Glynn, Esq.

[57] ABSTRACT

A sucrose-free, artificial sweetener-free dietary fiber composition contains about 2 to about 95 percent methylcellulose by weight based on total weight of the composition, about 5 to about 40 percent natural coconut, and, 0 to about 93 percent non-sucrose containing inactive materials. The contents are preferably in fine powder form. The inactive materials include particulate filler materials, such as powdered natural grains. In one preferred embodiment, the invention is a sucrose-free, non-allergenic dietary fiber composition, consisting essentially of about 2 to about 95 percent methylcellulose balance being natural coconut, based on the total weight of the methylcellulose and the coconut, more preferably, there is about 2 to about 40 percent methylcellulose balance being natural coconut.

16 Claims, No Drawings

SUCROSE-FREE DIETARY FIBER COMPOSITION

BACKGROUND OF THE INVENTION

1. Field of the Invention

The present invention relates to dietary supplements for regularity, and more particularly, to sucrose-free, artificial sweetener-free dietary compositions containing methylcellulose and coconut. In one preferred composition, only non-allergenic constituents are used.

2. Information Disclosure Statement

The following represents teachings relating to fiber-based dietary supplements:

U.S. Pat. No. 4,619,831 issued to Shri C. Sharma, on Oct. 28, 1986, describes a dietary fiber composition which is prepared by coating an insoluble fiber with a soluble fiber. The insoluble fiber is preferably derived from cereal bran by enzymatically and chemically purifying the bran. The soluble fiber is preferably pectin or an alginate. The dietary fiber composition can be used to prepare low calorie, high fiber content dietary food products.

U.S. Pat. No. 5,073,370 issued to E. Harvey Meer et al, on Dec. 17, 1991, describes a natural fiber laxative that is provided which consists of psyllium husk, apple fiber, fructose, gum arabic and flavorants. The psyllium husk and the apple fiber constitute together at least 75% by weight of the composition. The granular components are controlled to have a particle size less than that determined by a No. 50 mesh, thereby improving mouthfeel. The composition is, in addition to being all natural, low in calorie and high in fiber and when mixed with water has a palatable mouthfeel.

U.S. Pat. No. 5,516,524 issued to Theresa m. Kais et al, on May 14, 1996 describes an ingestible laxative composition which comprises specified amounts of dioctyl sulfosuccinate and bulk fiber selected from the group consisting of psyllium, methylcellulose, polycarbophil, calcium polycarbophil, bran, malt soup extract, karaya, guar gum, and mixtures thereof, preferably in single dose form.

A product known as Citrucel® distributed by SmithKline Beecham Consumer Healthcare, L. P., Pittsburgh, Pa., is a methylcellulose fiber therapy for regularity which includes methylcellulose, a nonallergenic fiber, as the active ingredient and includes fruit flavors, citric acid, sucrose and other inactives. Their sugar-free product under the same trademark contains an artificial sweetener as well as natural fruit flavors.

Notwithstanding the above prior art, there are no teachings or suggestions that would render the present invention anticipated or obvious, wherein sucrose-free dietary compositions are based on methylcellulose-coconut mixtures.

SUMMARY OF THE INVENTION

A sucrose-free, artificial sweetener-free dietary fiber composition contains about 2 to about 95 percent methylcellulose by weight based on total weight of the composition, about 5 to about 40 percent natural coconut, and, 0 to about 93 percent non-sucrose, non-artificial sweetener containing, inactive materials. The contents are preferably in fine powder form. The inactive materials include particulate filler materials, such as powdered natural grains. In one preferred embodiment, the invention is a sucrose-free, non-allergenic dietary fiber composition, consisting essentially of about 2 to about 95 percent methylcellulose balance being natural coconut, based on the total weight of the methylcellulose and the coconut, more preferably, there is about 2 to about 40 percent methylcellulose balance being natural coconut.

DETAILED DESCRIPTION OF THE PRESENT INVENTION

For about three decades there has been an increased awareness among consumers regarding the benefits of high fiber content diets. These benefits include apparent decreases in intestinal and colon diseases, including cancer. Additionally, fiber products are used as therapy for regularity and are often used in place of other laxative products. As described above, the prior art is replete with edible fibrous cellulose products. However, they contain oils, sucrose, fat syrups, acids such as citric acid, fruits and sweeteners.

The primary objective of the present invention is to provide dietary fiber compositions which exclude any significant amounts of sucrose or artificial sweetener. The purpose of the present invention is multifold: (1) to provide a sugar-free, artificial sweetener-free product to consumers who require fiber therapy for regularity and who philosophically abhor sugar intake; (2) to provide non-allergenic products for people who have needs for fiber therapy for regularity and require non-allergenic products; and, (3) to provide sugar-free products to people who require sugar-free diets, such as people who do not tolerate sugar-containing products, as well as hyperglycemics and hypoglycemics. Thus, a secondary purpose of the present invention is to provide the aforesaid products in a non-allergenic form.

Thus, one embodiment of the present invention involves compositions essentially consisting of only methylcellulose and natural coconut. These compositions typically contain about 2 to 95 percent methylcellulose, balance being natural coconut, based on the total weight of the methylcellulose and the natural coconut. Typically, there is about 2 to 40 percent methylcellulose, balance being natural coconut. Both the methylcellulose and the natural coconut are in powdered form. In another embodiment, preservatives may be included to extend the life of the coconut. Such additives include BHT or other known preservatives within the skill of the artisan.

In yet another embodiment of the present invention, the compositions include methylcellulose, coconut and inactive non-sucrose containing non-artificial sweetener materials. Thus the composition includes about 2 to about 95 percent methylcellulose, about 5 to about 40 percent natural coconut and up to about 93 percent non-sucrose additional materials. These additional materials may be particulate fillers, or nutrients, vitamins or other additives. The fillers may be natural grains such as wheat, corn, barley, rye oats or mixtures thereof. In one preferred embodiment, the composition contains about 2 to about 40 percent methylcellulose, about 5 to about 25 percent natural coconut and about 20 to about 93 percent non-sucrose containing inactive materials. Active materials may also be included without exceeding present scope of invention, but are non-essential.

The above compositions generally cannot be consumed dry, and should be mixed with water or other liquids. Thus, with the composition of the present invention, consumers enjoy sucrose-free, artificial sweetener-free, beneficial dietary fiber supplements with the enjoyment of coconut flavor.

The following examples are representative of the present invention:

| CONTENT | AMOUNT (g) | % |
| --- | --- | --- |
| EXAMPLE 1 | | |
| methylcellulose | 33 | 66 |
| powdered coconut | 17 | 34 |
| EXAMPLE 2 | | |
| methylcellulose | 25 | 25 |
| powdered coconut | 75 | 75 |
| EXAMPLE 3 | | |
| methylcellulose | 20 | 20 |
| powdered coconut | 10 | 10 |
| powdered rye oat | 70 | 70 |
| EXAMPLE 4 | | |
| methylcellulose | 15 | 15 |
| powdered coconut | 15 | 15 |
| powdered wheat | 60 | 60 |
| rivoflavin | 5 | 5 |
| powdered corn | 4 | 4 |
| ascorbic acid | 1 | 1 |

Obviously numerous modifications and variations of the present invention are possible in light of the above teachings. It is therefore understood that within the scope of the appended claims, the invention may be practiced otherwise than as specifically described herein.

What is claimed is:

1. A sucrose-free, artificial sweetener-free dietary fiber composition which comprises:

(a) about 2 to about 95 percent methylcellulose by weight based on total weight of the composition;

(b) about 5 to about 40 percent natural coconut; and, (c) 0 to about 93 percent non-sucrose, non- artificial sweetener containing inactive materials.

2. The composition of claim 1 wherein said coconut is powdered coconut.

3. The composition of claim 1 further containing a preservative to extend shelf life of the coconut.

4. The composition of claim 1 wherein said inactive materials include particulate filler materials.

5. The composition of claim 4 wherein said filler materials are selected from the group consisting of powdered natural grains of wheat, corn, barley, rye oats and mixtures thereof.

6. The composition of claim 1 wherein said composition is a fine powdered mixture.

7. The composition of claim 1 which contains about 2 to about 40 percent methylcellulose.

8. The composition of claim 7 which contains about 5 to about 25 percent natural coconut.

9. The composition of claim 8 which contains about 20 to about 93 percent non-sucrose containing inactive materials.

10. The composition of claim 7 which contains about 20 to about 93 percent non-sucrose containing inactive materials.

11. The composition of claim 1 which contains about 5 to about 25 percent natural coconut.

12. The composition of claim 11 which contains about 20 to about 93 percent non-sucrose containing inactive materials.

13. The composition of claim 1 which contains about 20 to about 93 percent non-sucrose containing inactive materials.

14. A sucrose-free, artificial sweetener-free non-allergenic dietary fiber composition, which consists essentially of:

about 2 to about 95 percent methylcellulose, balance being natural coconut, based on the total weight of the methylcellulose and the coconut.

15. The composition of claim 14 wherein there is about 2 to about 40 percent methylcellulose, balance being natural coconut.

16. The composition of claim 14 further containing a preservative to extend shelf life of the coconut.

* * * * *